US011885491B2

(12) United States Patent
Larignon et al.

(10) Patent No.: US 11,885,491 B2
(45) Date of Patent: Jan. 30, 2024

(54) BURNER MAINTENANCE TOOL

(71) Applicant: FIVES PILLARD, Marseilles (FR)

(72) Inventors: Antoine Larignon, Marseilles (FR); Guan Senmu, Beijing (CN)

(73) Assignee: FIVES PILLARD, Marseilles (FR)

( * ) Notice: Subject to any disclaimer, the term of this patent is extended or adjusted under 35 U.S.C. 154(b) by 632 days.

(21) Appl. No.: 16/769,038

(22) PCT Filed: Dec. 13, 2018

(86) PCT No.: PCT/FR2018/053274
§ 371 (c)(1),
(2) Date: Jun. 2, 2020

(87) PCT Pub. No.: WO2019/122622
PCT Pub. Date: Jun. 27, 2019

(65) Prior Publication Data
US 2021/0172598 A1 Jun. 10, 2021

(30) Foreign Application Priority Data
Dec. 21, 2017 (FR) ...................................... 1762884

(51) Int. Cl.
*F23D 14/50* (2006.01)
*B08B 1/00* (2006.01)
(Continued)

(52) U.S. Cl.
CPC .............. *F23D 14/50* (2013.01); *B08B 1/005* (2013.01); *B08B 1/04* (2013.01); *B08B 7/04* (2013.01);
(Continued)

(58) Field of Classification Search
CPC ........ F23D 14/50; F23D 11/38; F23D 11/386; F23D 2900/00002; F23D 2900/31018;
(Continued)

(56) References Cited

U.S. PATENT DOCUMENTS 2,126,838 A * 8/1938 Stoner .................. F23D 11/386 239/117
2,342,228 A 2/1944 Treat
(Continued)

FOREIGN PATENT DOCUMENTS

CN 205939187 U * 2/2017 ................ F23J 1/04
CN 206683425 U * 11/2017 ............ F27D 25/00
(Continued)

OTHER PUBLICATIONS

"_Definition—Merriam-Webster 2023-05-01.pdf", https://www.merriam-webster.com/dictionary/chamfer, Merriam-Webster, Incorporated, May 1, 2023. (Year: 2023).*
(Continued)

*Primary Examiner* — Steven B McAllister
*Assistant Examiner* — Daniel E. Namay
(74) *Attorney, Agent, or Firm* — CANTOR COLBURN LLP

(57) ABSTRACT

A device for cleaning a tip of a furnace burner including a support tube of axis X intended to pass through the burner and where the support tube includes a metal cable connected at one of its ends to a scraper and at the other end to a system for setting and maintaining the position of the scraper, where the scraper is articulated on the support tube between a first position aligned with the axis X in the continuation of the support tube and a second position perpendicular to the axis X, where the scraper has a chamfered part on its profile and where the support tube is connected to a rotation means for rotating the entire whole device in rotation. It can be set in place and manipulated from the rear of the burner, thereby ensuring a good level of safety for interventions, such that a rotational and/or translational movement about the tip of the burner allows the concretions to be cleaned off effec-
(Continued)

tively whatever their nature (shape, hardness, etc.) and their position.

11 Claims, 3 Drawing Sheets

(51) Int. Cl.

| | |
|---|---|
| ***B08B 1/04*** | (2006.01) |
| ***F23D 11/38*** | (2006.01) |
| ***B08B 9/043*** | (2006.01) |
| ***B08B 9/045*** | (2006.01) |
| ***B08B 7/04*** | (2006.01) |
| *B08B 5/02* | (2006.01) |

(52) U.S. Cl.
CPC ............ *B08B 9/045* (2013.01); *B08B 9/0436* (2013.01); *F23D 11/38* (2013.01); *F23D 11/386* (2013.01); *B08B 5/02* (2013.01); *B08B 2209/04* (2013.01); *F23D 2900/00002* (2013.01); *F23D 2900/31018* (2021.05)

(58) Field of Classification Search
CPC .. B08B 1/005; B08B 1/04; B08B 5/02; B08B 7/04; B08B 9/0436; B08B 9/045; B08B 2209/04
USPC .......... 431/122; 137/242, 244; 237/115, 116, 237/123; 362/458
See application file for complete search history.

(56) References Cited

U.S. PATENT DOCUMENTS

| | | | | |
|---|---|---|---|---|
| 2,429,299 | A * | 10/1947 | Serafinovitch | F23D 14/50 451/75 |
| 2,755,850 | A * | 7/1956 | Cissell | F23D 14/50 431/122 |
| 3,175,239 | A | 3/1965 | Casperson | |
| 4,058,870 | A | 11/1977 | Goodwin | |
| 2008/0083076 | A1* | 4/2008 | Bos | F23D 14/50 15/23 |

FOREIGN PATENT DOCUMENTS

| | | | | |
|---|---|---|---|---|
| CN | 208860148 | U * | 5/2019 | F27D 25/00 |
| CN | 216174999 | U * | 4/2022 | B08B 9/043 |
| CN | 217635690 | U * | 10/2022 | F23J 1/06 |
| DE | 684726 | C | 12/1939 | |
| DE | 2157841 | B1 | 6/1973 | |
| FR | 367133 | A | 10/1906 | |

OTHER PUBLICATIONS

"IPSummaryTable-20230918.pdf", InnovationQ+(tm) Search Summary Table, ip.com, Sep. 18, 2023. (Year: 2023).*
International Search Report for corresponding application PCT/FR2018/053274 filed Dec. 13, 2018; dated Feb. 26, 2019.

* cited by examiner

BURNER MAINTENANCE TOOL

TECHNICAL FIELD

The present disclosure relates to rotary furnaces and more particularly to the burners of these furnaces.

BACKGROUND

In order to obtain correct combustion and a controlled flame shape, the burners present in rotary furnaces (notably kilns for cement works, lime production, etc.) generate air flows at high or very high speeds (200-300 m/s). Depending on the conditions prevailing in the furnace (temperature, amount of dust, percentage of liquid phase in the chemical compounds) these speed levels may create concretions which attach to the tips of the burner. A build-up of such concretions ultimately reduces the performance of the burner, by deflecting the flame, and this has an impact on the process (production quality, life of the refractory lining of the furnace, etc.) and can force the user to shut down his furnace in order to clean the burner tips.

In order to clean off concretions, cement works use, during running, a metal bar, a water jet, etc. These devices represent solutions that are improvised and somewhat ineffective, and above all dangerous to the staff and the imprecision of the cleaning operations causes damage to the refractory that protects the burner.

There is a need to prevent a build-up of concretions on the burner tips that may cause blockages to the air leading to deflection of the flame, while at the same time avoiding production shutdowns associated with the damage to the refractory bricks caused by a deflected flame, or impairment to the quality of the production, and to propose a safe and reliable solution to this indispensable maintenance operation.

BRIEF SUMMARY

The disclosure provides a tip cleaning system that allows a maintenance operation to be carried out without danger, with the burner in operation, and without the risk of a costly shutdown of the furnace.

The disclosure provides a device for cleaning the tips of a burner present in rotary furnaces, including a support tube of axis X intended to pass through the said burner, support tube including a metal cable connected at one of its ends to a scraper and at the other end to a system for setting and maintaining the position of the scraper, in that the scraper is articulated to on the support tube between a first position aligned with the axis X in the continuation of the support tube and a second position perpendicular to the axis X, in that the scraper has a chamfered part on its profile and in that the support tube is connected to a rotation means for setting rotating the entire whole device in rotation. It can be set in place and manipulated from the rear of the burner, thereby ensuring a good level of safety for interventions. Its rotational movement about the tip of the burner allows the concretions to be cleaned off effectively whatever their nature (shape, hardness, etc.). It is robust enough that it can be used without shutting down the burner while it is in operation (temperature resistance, position retention, repeatability of use). The device may for example be made of refractory stainless steel.

Advantageously, the support tube is connected to a means for hammering along the axis X. It is thus possible to translate the scraper back and forth along the axis X in a periodic or non-periodic longitudinal movement, which creates repeated blows by the scraper on the said tip. Thus, the tips can be cleaned off by a scouring action by a rotational movement or by a hammering action by a translational movement or by a combination of the two actions.

Advantageously, the metal cable is positioned outside the support tube. A set of guide tubes fixed to the support tube holds the cable in the correct position to prevent any pinching between the tool and the tube in which it is inserted.

As an alternative, the cable may be positioned inside the support tube in order to benefit from the mechanical protection of the latter. Thus there is nothing protruding from the support tube into the burner.

Advantageously, the support tube and the scraper have a diameter ≤73 mm. The diameter of the support tube and of the scraper are small in size so that they can be inserted into a standard tube. The device is thus compact and able to be inserted into most burners without costly modification, via an opening of reduced cross section.

Advantageously, the scraper is removable and interchangeable. It is thus possible to adapt it to suit the various diameters of burner by choosing longer or shorter scrapers and to choose different types of scrapers, sharpened to a greater or lesser degree, to improve the scouring of the tip, and which may or may not allow pressurized air or pulverulent materials to be injected.

Advantageously, the support tube is removable and interchangeable. It is thus possible to adapt to suit the various lengths of burner by choosing longer or shorter tubes, or else by welding an additional tube to the support tube. The cable is designed to be long enough or is replaced according to the new length of the burner.

Advantageously, the support tube and the scraper are hollow and communicating, the support tube is open on both sides, the scraper comprises holes communicating with the inside of the said scraper and arranged on one side, and the support tube and the scraper are intended to have compressed air passing through them. The compressed air circulates from the support tube towards the scraper. The compressed air is injected into the support tube as far as the inside of the scraper where it emerges via the holes, and allows a cleaning mode suited to certain conditions of fouling of the burner; it also allows the scraper to be held in the flame for longer without the risk of it becoming damaged as a result of the high temperatures inside the furnace.

Advantageously, the support tube and the scraper are hollow and communicating, the support tube is open on both sides, the scraper comprises holes communicating with the inside of the said scraper and arranged on one side and the support tube and the scraper have a fluid loaded with a pulverulent material passing through them. The pulverulent material circulates from the support tube towards the scraper. In the same way as with the compressed air, the fluid loaded with a pulverulent material such as sand for example allows a cleaning mode suited to conditions of significant fouling of the burner. The fluid used may be compressed air. In that case, the holes may be of a larger diameter.

Advantageously, the rotating system for rotating the whole device is a motorized wheel. The cleaning may thus be automated.

The disclosure also relates to a method for cleaning a burner of a rotary furnace that it is characterized in that it comprises the following steps:

- inserting and placing the device as described hereinabove in the burner, setting the scraper in position from the aligned first position to the perpendicular second position using the position setting and maintaining system, maintaining the scraper in position using the position setting and maintaining system, rotating the device using the rotating means.

The device allows a simple and effective mechanical cleaning method.

Advantageously, the insertion and placement of the device is performed using an actuator. It is thus possible to automate the method.

Advantageously, the device is set in translation along the axis X manually or using a motorized actuator, which, in addition to the scraping force, makes it possible to exert a force of hammering on excessive accumulations.

Thus, the cleaning of the tips is achieved by a scouring action by a rotational movement or by a hammering action by a translational movement or by the combination of the two actions.

Advantageously, the metal cable is connected at the other of its ends to a motorized winch. It is thus possible to automate the method.

BRIEF DESCRIPTION OF THE DRAWINGS

Further advantages may yet appear to those skilled in the art from reading the examples below, which are illustrated by the attached figures, given by way of example.

DETAILED DESCRIPTION

Figure 1:
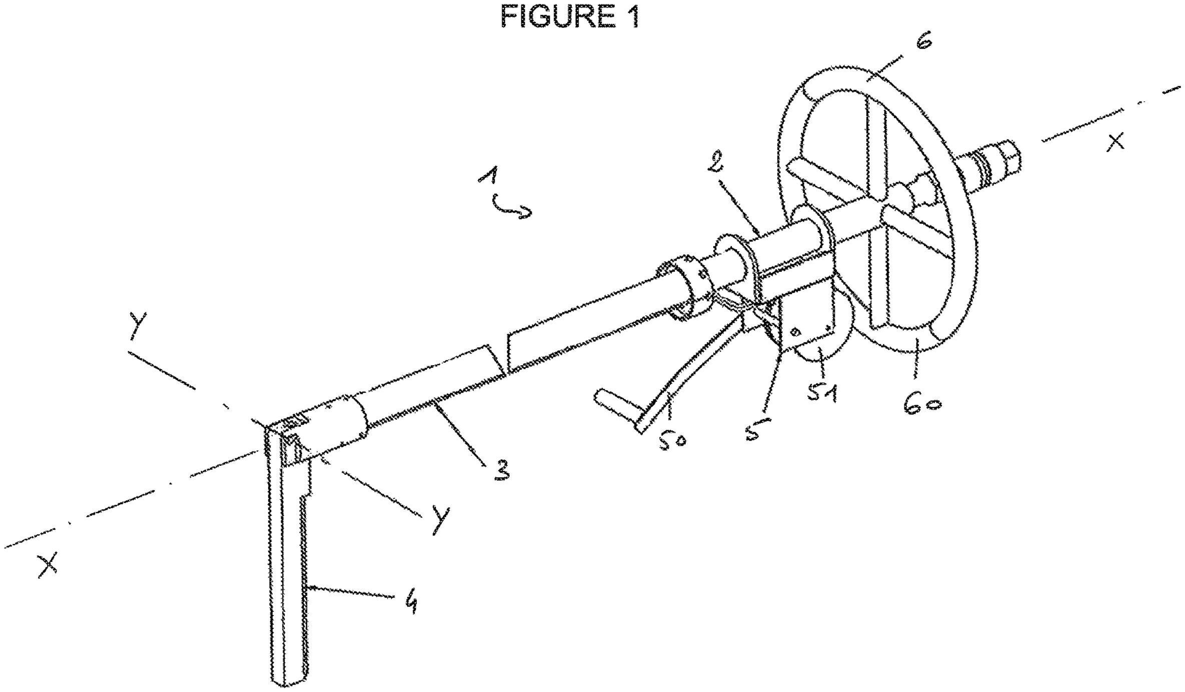
FIG. 1 is a perspective view of the device according to the disclosure.

The device 1 comprises a support tube 2 of axis X, a metal cable 3, a scraper 4 of elongate shape fixed to the support tube 2, a system 5 for setting and maintaining the position of the scraper 4, a rotating means 6 for rotating the device 1.

Figure 5:
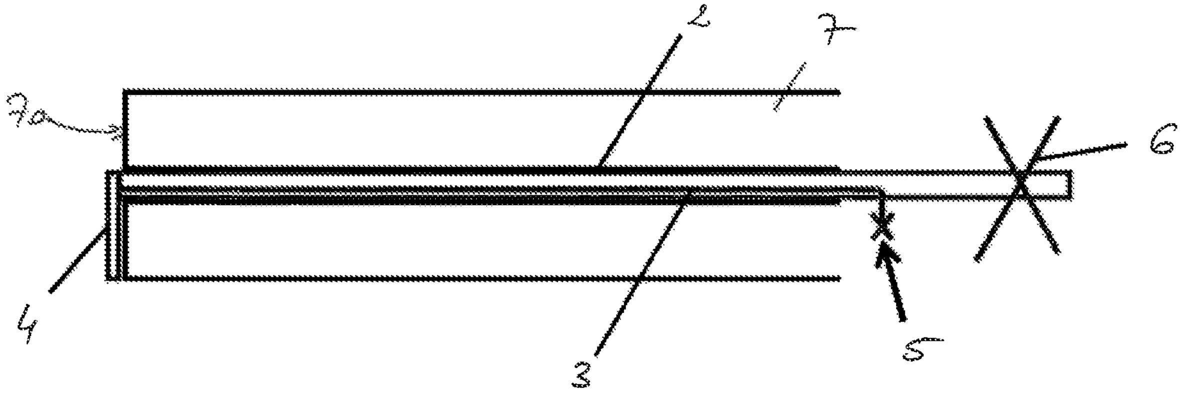
FIG. 5 is a schematic view of a burner equipped with the device according to the disclosure.
Figure 6:
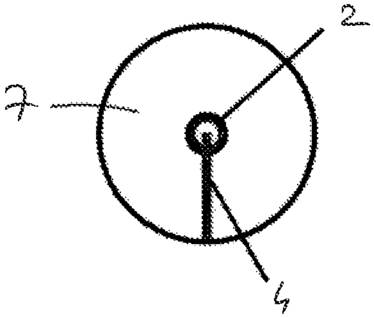
FIGS. 6 and 7 are end-on views of the tip of various burners with the device according to the disclosure.
Figure 7:
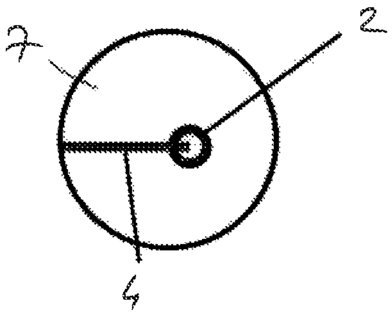

In FIG. 1, the metal cable 3 is positioned along the support tube 2 (FIG. 2A) inside guide tubes 21 attached to the support tube 2, but it could also be positioned inside the support tube 2 (FIG. 5).

The metal cable 3 is connected at one of its ends to the scraper 4 and at the other end to a system 5 for setting and maintaining the position of the scraper 4.

The scraper 4 is articulated to the support tube 2 about an axis Y perpendicular to the axis X at the end of the said support tube 2. It has two positions: a position aligned on the axis X in the continuation of the tube 2 and a second position perpendicular to the axis X, corresponding to the position of use of the scraper 4. The system 5 allows the scraper to be pivoted from one position to the other and held in position. The system 5 consists of a lever arm 50 driving a pulley 51 over which the metal cable 3 is wound. The lever arm 50 can be locked in order to immobilize the scraper 4.

Figure 2:
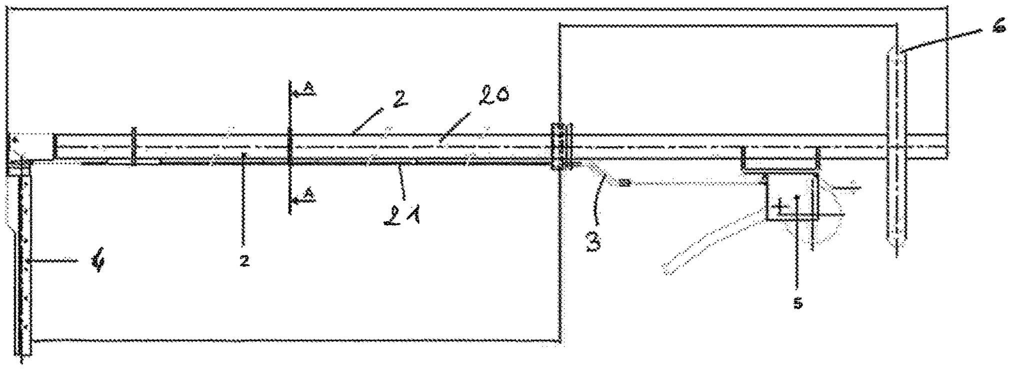
FIG. 2 is a view in section of the device on the axis X.
Figure 2A:
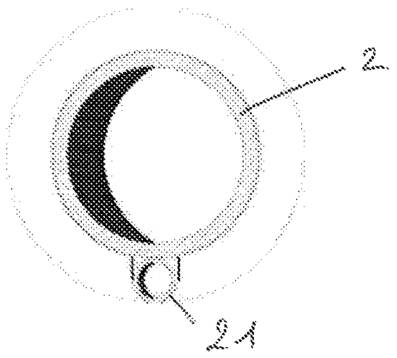
FIG. 2A is a view in section of the device on AA.

In FIGS. 1 and 2, the support tube 2 is connected to a wheel 60 which constitutes the rotating means 6. It may be motorized.

In a variant, the scraper 4 is hollow and has holes 40 connecting the hollow 41 to the outside. These holes 40 are distributed along the length of the scraper 4. They may be distributed evenly or unevenly.

Figure 4:
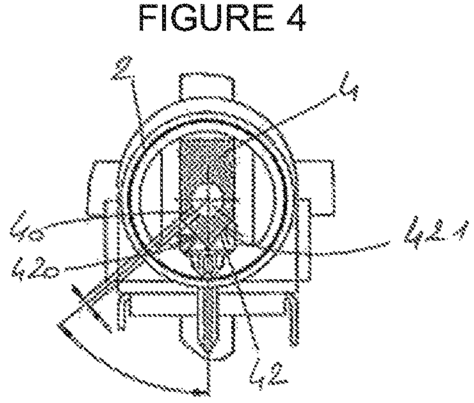
FIG. 4 is a view in section of the scraper on IV-IV.

As is visible in FIG. 4, the scraper 4 has a chamfered part 42 on its profile. The chamfered part 42 has two faces 420 and 421. One face is pierced with holes 40, or both are. When the two faces 420 and 421 are both pierced with holes, the holes 40 may be offset or staggered from one face to the other, or not.

The scraper 4 has a drilling 43 near its articulation 44 and this drilling is aligned with the inside 20 of the support tube 2 when the scraper is perpendicular to the support tube in the position of use.

The method of cleaning a burner 7 using the device 1 will now be described.

Figure 3:
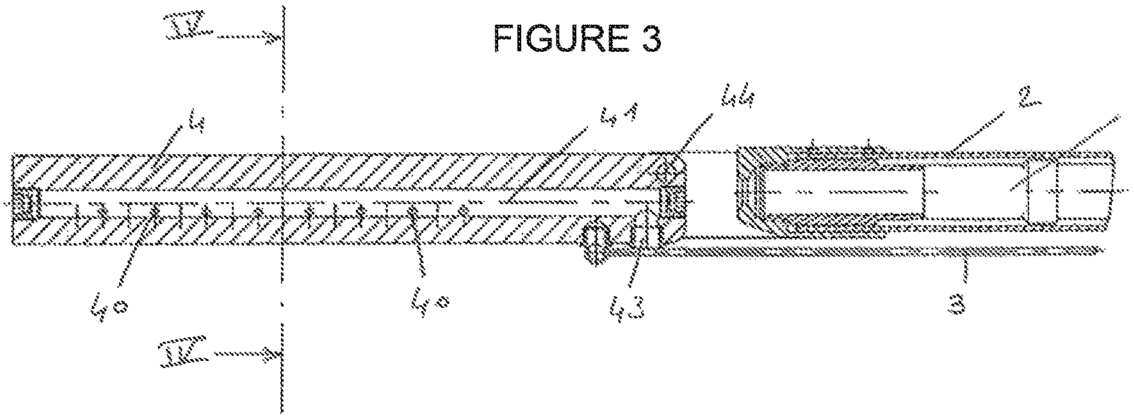
FIG. 3 is a view in section of the scraper aligned with the tube.

The device 1 is set in the elongate position in which the support tube 2 and the scraper 4 are in the continuation of one another as illustrated in FIG. 3. The device 1 is inserted into the burner 7 from the rear of the said burner 7 until such point as the scraper 4 completely emerges from the burner on the furnace side. The insertion may or may not be performed at the center.

The system 5 is actuated and causes the scraper 4 to pivot from its elongate position to its position perpendicular to the support tube 2 and keeps it in position pressed against the tip 70 of the burner. The position setting and maintaining system is produced using a winch with a pawl applied to a sprocket wheel which allows the scraper to remain pressed against the tip 70.

The device 1 is set in rotation by the wheel 60 either by hand or by a motor, driving the scraper 4 which will rub against the entire periphery of the tip 70 of the burner 7 and remove the concretions which have accumulated there.

The device 1 may also be moved in translation along the axis X by hand or by a motorized actuator, driving the scraper 4 which will hammer the surface of the tip 70 of the burner 7 and detach the concretions which have accumulated there.

The device offers a number of possibilities depending on the nature of the various accumulations (shape, hardness, etc.). Because the scraper 4 is removable and interchangeable, it is possible to select between different types of scraper 4.

If the concretions are not adhering very firmly and are relatively small in size, only a short-duration (<5 min) use of the tool will be needed and the device 1 will be fitted with a scraper 4 that allows simple mechanical cleaning, for example without holes 40.

If the concretions are adhering more firmly but are relatively small in size, this will entail a longer duration (>5 min) use of the tool and the device 1 will be equipped with a scraper 4 with holes 40 allowing mechanical cleaning assisted by pressurized pneumatic cleaning achieved by the addition of compressed air, making it possible:

to increase the efficacy of the cleaning to benefit from a cooling of the tool.

If the concretions are adhering very firmly and are large in size, the duration of use will be greater (>5 min) and the device 1 will be fitted with a scraper 4 with holes allowing mechanical cleaning assisted by pressure sandblasting achieved by adding compressed air laden with a pulverulent material (sand, abrasive, grit, etc.) making it possible:

to increase the efficiency of the cleaning to benefit from a cooling of the tool.

The system is set in motion by the rotating means 6; this means may be manual or automated using a mechanism of the motor and actuator type.

The invention claimed is:

1. Device for cleaning a tip of a furnace burner comprising a support tube of axis X intended to pass through the burner and wherein the support tube comprises a metal cable connected at an end to a scraper and at another end to a system for setting and maintaining the position of the scraper, wherein the scraper is articulated on the support tube between a first position aligned with the axis X in the continuation of the support tube and a second position perpendicular to the axis X, and wherein the scraper has a chamfered part on a profile and the support tube is connected to a means for rotating the whole device, wherein the support tube and the scraper are hollow and communicating, the support tube is open on both sides, the scraper comprises holes communicating with the inside of the scraper and arranged on one side and the support tube and the scraper are intended to have a fluid loaded with a pulverulent material passing through them.

2. Device according to claim 1, wherein the support tube is connected to a means for hammering along the axis X.

3. Device according to claim 1, wherein the support tube and the scraper have a diameter ≤73 mm.

4. Device according to claim 1, wherein the scraper is removable and interchangeable.

5. Device according to claim 1, wherein the support tube is removable and interchangeable.

6. Device according to claim 1, wherein the support tube and the scraper are hollow and communicating, wherein the support tube is open on both sides, wherein the scraper comprises holes communicating with the inside of the scraper and arranged on one side, and wherein the support tube and the scraper are intended to have compressed air passing through them.

7. Device according to claim 1, wherein the means for rotating the whole device is a motorized wheel.

8. Method for cleaning a burner of a rotary furnace, comprising:

inserting and placing the device according to claim 1 in the burner, setting the scraper in position from the aligned first position to the perpendicular second position using the position setting and maintaining system, maintaining the scraper using the position setting and maintaining system, rotating the device using the rotating means.

9. Cleaning method according to claim 8, wherein the insertion and placement of the device is performed using an actuator.

10. Cleaning method according to claim 8, wherein the device is moved in translation along the axis X manually or using a motorized actuator.

11. Cleaning method according to claim 8, wherein the metal cable is connected at the other of its ends to a motorized winch.

* * * * *